(12) United States Patent
Hoshi et al.

(10) Patent No.: US 11,414,078 B2
(45) Date of Patent: Aug. 16, 2022

(54) VEHICLE

(71) Applicant: SUBARU CORPORATION, Tokyo (JP)

(72) Inventors: Ryohei Hoshi, Tokyo (JP); Fumiyuki Moriya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 279 days.

(21) Appl. No.: 16/880,486

(22) Filed: May 21, 2020

(65) Prior Publication Data
US 2021/0039645 A1 Feb. 11, 2021

(30) Foreign Application Priority Data
Aug. 6, 2019 (JP) .............................. JP2019-144097

(51) Int. Cl.
*B60W 30/18* (2012.01)
*B60W 10/06* (2006.01)
(Continued)

(52) U.S. Cl.
CPC ...... *B60W 30/18018* (2013.01); *B60W 10/06* (2013.01); *B60W 10/18* (2013.01);
(Continued)

(58) Field of Classification Search
CPC .......... B60W 30/18018; B60W 10/06; B60W 10/18; B60W 30/18109; B60W 30/18118;
(Continued)

(56) References Cited

U.S. PATENT DOCUMENTS

| 5,713,436 A * | 2/1998 | Gjovik | F16D 49/00 |
| | | | 188/29 |
| 7,092,809 B2 * | 8/2006 | Endres | B60T 7/12 |
| | | | 701/70 |

(Continued)

FOREIGN PATENT DOCUMENTS

| JP | 2018-069911 A | 5/2018 | |
| WO | WO-2008115132 A1 * | 9/2008 | .............. B60T 7/122 |

(Continued)

*Primary Examiner* — Sizo B Vilakazi
*Assistant Examiner* — Brian R Kirby
(74) *Attorney, Agent, or Firm* — McGinn IP Law Group, PLLC (57) ABSTRACT

A vehicle includes a controller and an operating unit. The controller controls an automatic vehicle hold (AVH) system maintaining the brake of the vehicle even after an operation of the brake pedal is canceled, and an idling stop system (ISS) stopping idling of an internal combustion engine. The operating unit switches the AVH and ISS between an enabled state and a disabled state in response to an occupant's operation. When the vehicle comes to a stop, the controller activates the AVH in a case where the operation of the brake pedal satisfies a first operation condition, and activates the ISS in a case where the operation of the brake pedal satisfies a second operation condition. The controller changes at least one of the first operation condition or the second operation condition when the AVH and the ISS are both switched to the enabled state by the operating unit.

14 Claims, 5 Drawing Sheets

(51) Int. Cl.
  *B60W 10/18* (2012.01)
  *F02N 11/08* (2006.01)
(52) U.S. Cl.
  CPC ............... *B60W 30/18109* (2013.01); *B60W 30/18118* (2013.01); *F02N 11/0818* (2013.01); *B60T 2201/06* (2013.01); *B60W 2540/12* (2013.01)
(58) Field of Classification Search
  CPC ............ B60W 2540/12; B60W 20/00; B60W 2552/15; B60W 10/182; F02N 11/0818; F02N 11/0822; F02N 2200/0801; F02N 2200/102; F02N 2200/106; B60T 2201/06; B60T 7/12; B60T 11/103; Y02T 10/40; F02D 41/042; F02D 2200/602
  USPC ............... 701/70, 101, 112; 477/21, 73, 93; 123/179.4
  See application file for complete search history.

(56) References Cited

U.S. PATENT DOCUMENTS

| | | | | |
|---|---|---|---|---|
| 7,585,250 B2 * | 9/2009 | Braun | ................... | B60W 10/04 477/200 |
| 8,090,499 B2 * | 1/2012 | Tamai | ................... | B60W 10/06 477/6 |
| 8,579,765 B2 * | 11/2013 | Yu | ...................... | B60W 10/188 477/184 |
| 8,672,809 B2 * | 3/2014 | Saito | ...................... | F02D 17/02 477/203 |
| 8,821,348 B2 * | 9/2014 | Yu | ...................... | F02N 11/0822 477/203 |
| 8,998,774 B2 * | 4/2015 | Yu | ...................... | F02N 11/0822 477/203 |
| 9,050,967 B1 * | 6/2015 | Lyon | ................ | B60W 30/18018 |
| 9,278,680 B2 * | 3/2016 | Seguchi | ................ | B60W 10/06 |
| 9,434,360 B2 * | 9/2016 | Beger | ..................... | B60T 8/171 |
| 9,682,705 B2 * | 6/2017 | Khafagy | ......... | B60W 30/18018 |
| 9,731,722 B2 * | 8/2017 | Khafagy | ......... | B60W 40/076 |
| 10,336,330 B2 * | 7/2019 | Books | ................... | B60W 10/06 |
| 10,549,756 B2 * | 2/2020 | Pursifull | .................. | B60T 7/12 |
| 2002/0094899 A1 * | 7/2002 | Hamai | ..................... | F16H 3/725 903/952 |
| 2004/0038774 A1 * | 2/2004 | Kuroda | .......... | B60W 30/18027 477/3 |
| 2006/0111823 A1 * | 5/2006 | Tamai | ................ | B60W 10/184 701/38 |
| 2006/0184304 A1 * | 8/2006 | Katou | ................... | B60W 10/06 701/54 |
| 2007/0073466 A1 * | 3/2007 | Tamai | ..................... | B60L 50/16 701/22 |
| 2011/0238284 A1 * | 9/2011 | Bollig | ................. | B60W 30/192 701/113 |
| 2016/0297415 A1 * | 10/2016 | Kato | .................... | F02D 41/065 |
| 2016/0304096 A1 * | 10/2016 | Khafagy | .......... | B60W 30/18118 |
| 2018/0065638 A1 * | 3/2018 | Kawahara | .......... | B60W 10/184 |
| 2018/0306128 A1 * | 10/2018 | Okitsu | ............ | B60W 30/18118 |
| 2020/0062225 A1 * | 2/2020 | Kobori | ................. | B60W 10/06 |

FOREIGN PATENT DOCUMENTS

| | | | | |
|---|---|---|---|---|
| WO | WO-2010102719 A1 * | 9/2010 | ............ | B60T 17/221 |
| WO | WO-2014168016 A1 * | 10/2014 | ......... | F02N 11/0833 |

* cited by examiner

VEHICLE

CROSS-REFERENCE TO RELATED APPLICATIONS

The present application claims priority from Japanese Patent Application No. 2019-144097 filed on Aug. 6, 2019, the entire contents of which are hereby incorporated by reference.

BACKGROUND

The disclosure relates to a vehicle having an idling stop system and an automatic vehicle hold system.

Many recent engine-driven vehicles are provided with an idling stop system. For example, when the brake pedal is depressed by an amount equal to or larger than a predetermined threshold value to a stop the vehicle, the idling stop system is activated to stop idling of the engine.

In recent years, vehicles with an automatic vehicle hold system have been put to practical use. The automatic vehicle hold system maintains the brake of a vehicle even after the brake pedal is released, allowing the driver to remove and rest his or her foot away from the brake pedal while the driver is waiting for a stoplight, for example.

Japanese Unexamined Patent Application Publication No. 2018-069911 discloses a vehicle having both the idling stop system and the automatic vehicle hold system.

SUMMARY

An aspect of the technology provides a vehicle including a controller and an operating unit. The controller is configured to control an automatic vehicle hold system and an idling stop system. The automatic vehicle hold system maintains a brake of the vehicle even after an operation of the brake pedal is canceled. The idling stop system stops idling of an internal combustion engine. The operating unit is configured to switch the automatic vehicle hold system and the idling stop system between an enabled state and a disabled state in response to an operation by an occupant of the vehicle. The occupant includes a driver of the vehicle. The controller is configured to activate the automatic vehicle hold system in a case where the operation of the brake pedal satisfies a first operation condition when the vehicle comes to a stop, activate the idling stop system in a case where the operation of the brake pedal satisfies a second operation condition when the vehicle comes to a stop, and change at least one of the first operation condition or the second operation condition when the automatic vehicle hold system and the idling stop system are both switched to the enabled state by the operating unit.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some example embodiments of the disclosure will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

While a vehicle is stopped, there can be a situation where the driver wants to remove and rest his or her foot away from the brake pedal but quickly restart the vehicle when a starting condition is met. In such a situation, for example, the automatic vehicle hold system may be activated without activating the idling stop system. In another situation where the driver wants to rest his or her foot away from the brake pedal and does not have to quickly restart the vehicle, for example, the idling stop system and the automatic vehicle hold system may both be activated when the vehicle comes to a stop. In many other situations, the driver wants to activate only the idling stop system without activating the automatic vehicle hold system.

In general, the automatic vehicle hold system and the idling stop system may be switched between an enabled state and a disabled state by a button operation. However, such a button operation is not assumed to be performed by the driver every time the vehicle comes to a stop. Additionally, in general, the automatic vehicle hold system and the idling stop system may be switched between an activated state and a deactivated state by operating a brake pedal used for stopping the vehicle. However, in general, it is difficult to activate one of the idling stop system and the automatic vehicle hold system and deactivate the other one by the brake pedal operation.

It is desirable to provide a vehicle that allows an occupant of the vehicle to readily select, through an operation of a brake pedal, the activation of both of an idling stop system and an automatic vehicle hold system or the activation of one of the idling stop system and the automatic vehicle hold system.

Figure 1:
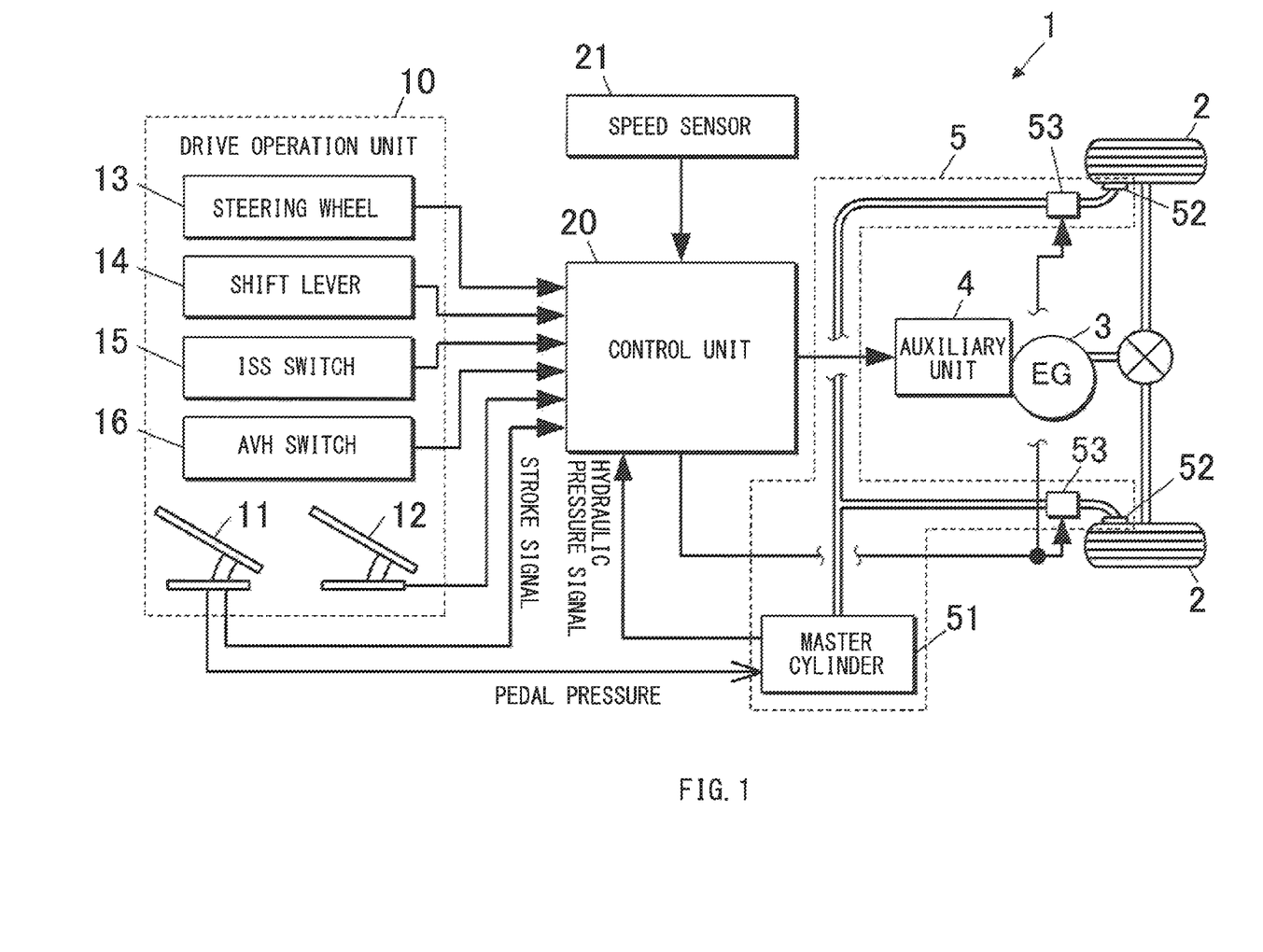
FIG. 1 is a block diagram illustrating a vehicle according to one example embodiment of the technology.

Some example embodiments of the technology will now be described with reference to the accompanying drawings. FIG. 1 is a block diagram illustrating a vehicle according to an example embodiment of the technology.

A vehicle 1 according to an example embodiment may be an engine-driven vehicle including an idling stop system (hereinafter referred to as ISS) and an automatic vehicle hold system (hereinafter referred to as AVH). The vehicle 1 may be any automatic vehicle including an internal combustion engine, such as a hybrid electric vehicle (HEV). The ISS stops idling of the engine when the vehicle comes to a stop. The AVH maintains the brake of the vehicle even after the driver removes his or her foot away from the brake pedal when the vehicle comes to a stop.

The vehicle 1 according to this example embodiment may include driving wheels 2, an engine 3, an auxiliary unit 4, a brake system 5, a drive operation unit 10, a controller 20, and a speed sensor 21, as illustrated in FIG. 1. The engine 3 may be an internal combustion engine and generate power for the driving wheels 2. The auxiliary unit 4 may support the operation of the engine 3. The brake system 5 may performs braking of the vehicle 1. The drive operation unit 10 may be operated by the driver or an occupant. The controller 20 may perform traveling control. The speed sensor 21 may detect a vehicle speed.

The brake system 5 may include a brake unit 52, a master cylinder 51, and a control valve 53. The brake unit 52 may be a caliper, for example, and receive hydraulic pressure to cause a braking force to act on the driving wheels 2. The master cylinder 51 may convert the pedal pressure on a brake pedal 11 to hydraulic pressure and transmit the hydraulic pressure to the brake unit 52. The control valve 53 may be switchable between holding and releasing the hydraulic pressure of the brake unit 52. The control valve 53 may maintain the hydraulic pressure applied to the brake unit 52 to retain the braking force of the brake unit 52. Alternatively, the brake unit 52 may have a configuration that causes the braking force to act on non-illustrated driven wheels, instead of the driving wheels 2.

The drive operation unit 10 may include a brake pedal 11, an accelerator pedal 12, a steering wheel 13, a shift lever 14, an ISS switch 15, and an AVH switch 16. The shift lever 14 may be used to perform a shifting operation of the transmission. The ISS switch 15 switches the ISS between an enabled state and a disabled state. The AVH switch 16 switches the AVH between an enabled state and a disabled state. The occupant may operate the ISS switch 15 and the AVH switch 16 to switch between four states: an ISS-enabled and AVH-enabled state; an ISS-disabled and AVH-enabled state; an ISS-enabled and AVH-disabled state; and an ISS-disabled and AVH-disabled state. In one embodiment, the ISS switch 15 and the AVH switch 16 may serve as an "operating unit".

The auxiliary unit 4 may include, for example, a fuel injector that injects fuel into the engine 3, an ignitor that ignites the fuel, and a starter motor that starts the engine 3.

The controller 20 may receive operation signals from various operating devices of the drive operation unit 10 and detection signals from the speed sensor 21, and control the auxiliary unit 4 and the control valve 53. The controller 20 may receive a signal regarding the pedal pressure on the brake pedal 11. The signal regarding the pedal pressure may be, for example, a detection signal of the hydraulic pressure applied by the master cylinder 51. The controller 20 may include one electronic control unit (ECU) or multiple ECUs communicating with each other and operating in cooperation. The controller 20 may execute various control processes by causing a central processing unit (CPU) to execute a control program. The control processes may include a traveling control process, a switching process, and a traveling stop process. The traveling control process may be a process of causing the vehicle 1 to travel in accordance with the driving operation by the driver. The switching process may be a process of switching the ISS or the AVH between the enabled state and the disabled state in response to the operation of the ISS switch 15 or the AVH switch 16. The traveling stop process may be a process of activating one or both of the ISS and the AVH when the vehicle comes to a stop.

The AVH may be activated when the controller 20 operates (for example, close) the control valve 53 while the driver is depressing the brake pedal 11 to generate a braking force. After the activation of the AVH, the controller 20 may open the control valve 53 in response to the start of a depressing operation of the accelerator pedal 12, releasing the braking force. In the example embodiments of the technology, the wording "activation of the AVH" may refer to a transition to a state in which the braking force is maintained by the AVH, and the wording "deactivation of the AVH" may refer to releasing of the braking force maintained by the AVH after the activation of the AVH.

The ISS may be an operation in which the controller 20 stops the idling of the engine 3 by controlling the auxiliary unit 4 when the vehicle comes to a stop. In the example embodiments of the technology, the wording "activation of the ISS" may refer to stopping the idling operation of the engine 3 by the ISS when the vehicle comes to a stop. After the activation of the ISS, the controller 20 may restart the engine 3 by controlling the auxiliary unit 4 in response to the start of a returning operation of the brake pedal 11 at a predetermined speed or higher or the start of a depressing operation of the accelerator pedal 12. In the example embodiments of the technology, the wording "deactivation of the ISS" may refer to restarting of the engine 3 after the activation of the ISS.

First Example Embodiment

Figure 2:
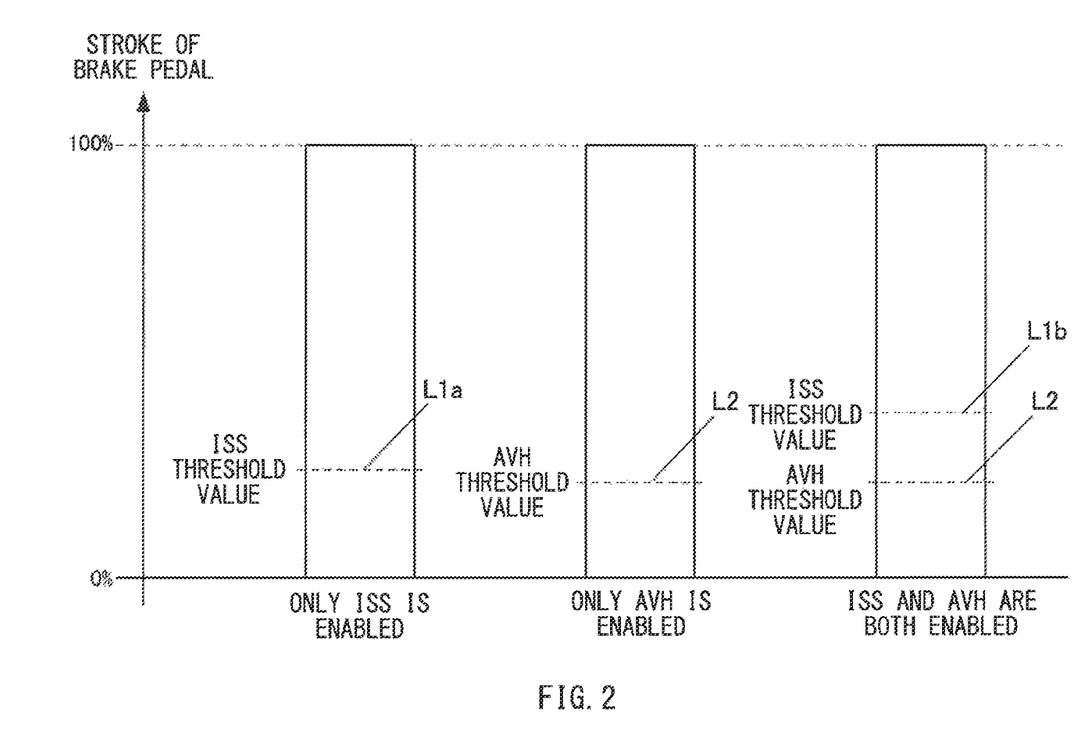
FIG. 2 is a diagram illustrating ISS threshold values and AVH threshold values according to one example embodiment.

The control of the AVH and the ISS according to the first example embodiment will now be described. FIG. 2 is a diagram illustrating ISS threshold values and AVH threshold values according to the first example embodiment.

In the vehicle 1 according to the first example embodiment, the ISS and the AVH may be activated when respective operation conditions are satisfied. The operation condition may be that the brake pedal 11 is depressed with a predetermined stroke or larger when the vehicle comes to a stop. The predetermined stroke that activates the ISS may be referred to as an "ISS threshold value", and the predetermined stroke that activates the AVH may be referred to as an "AVH threshold value". In one embodiment, the AVH threshold value may serve as a "first threshold value". In one embodiment, the ISS threshold value may serve as a "second threshold value". In one embodiment, the operation condition of the brake pedal 11 that activates the AVH may serve as a "first operation condition". In one embodiment, the operation condition of the brake pedal 11 that activates the ISS may serve as a "second operation condition".

As illustrated in FIG. 2, different ISS threshold values may be set between when only the ISS is enabled and when the ISS and the AVH are both enabled. When only the ISS is enabled, an ISS threshold value L1a indicating a small stroke may be set. When the ISS and the AVH are both enabled, an ISS threshold L1b indicating a large stroke may be set. The difference between the ISS threshold value L1a and an AVH threshold value L2 may be small when only the ISS is enabled. In comparison, the difference between the ISS threshold value L1b and the AVH threshold value L2 may be large when the ISS and the AVH are both enabled. The ISS threshold value L1b may be greater than the AVH threshold value L2 when the ISS and the AVH are both enabled. Note that the wording "only the ISS is enabled" may refer to a state in which the ISS is enabled and the AVH is disabled.

As illustrated in FIG. 2, the AVH threshold value L2 may be kept unchanged between when only the AVH is enabled and when the ISS and the AVH are both enabled. Note that the AVH threshold value may not be limited to this example, and may differ in the different states. In the example illustrated in FIG. 2, the AVH threshold value L2 may be smaller than the ISS threshold value L1a when only the ISS is enabled. Alternatively, the AVH threshold value L2 may be the same as or larger than the ISS threshold value L1a. The wording "only the AVH is enabled" may refer to a state in which the ISS is disabled and the AVH is enabled.

The ISS threshold value L1a may be a value that provides the driver with a satisfactory operation feeling when only the ISS is enabled. For example, the ISS threshold value L1a set when only the ISS is enabled may be a value that allows the driver to readily activate the ISS after a standard operation of the brake pedal 11 to stop the vehicle. The AVH threshold value L2 may be a value that provides the driver with a satisfactory operation feeling when only the AVH is enabled. For example, the AVH threshold value L2 set when only the AVH is enabled may be a value that allows the driver to readily activate the AVH after the driver performs a standard operation of the brake pedal 11 to stop the vehicle.

In the vehicle 1 according to the first example embodiment, when the ISS and the AVH are both switched to the enabled state, one or both of the ISS threshold value and the AVH threshold value (e.g., only the ISS threshold value) may be changed to increase the difference between the ISS threshold value and the AVH threshold value. For example, in the example embodiment illustrated in FIG. 2, the ISS threshold value L1a may be changed to the larger ISS threshold value L1b to generate a large margin between the AVH threshold value L2 and the ISS threshold value L1b. When the vehicle comes to a stop, the driver may depress the brake pedal 11 with a stroke that falls within this margin and thereby is able to readily activate the AVH without activating the ISS. Additionally, upon or immediately after the stop of the vehicle, the driver may depress the brake pedal 11 with a stroke equal to or larger than the ISS threshold value L1b and thereby is able to readily activate both of the AVH and the ISS.

Figure 3:
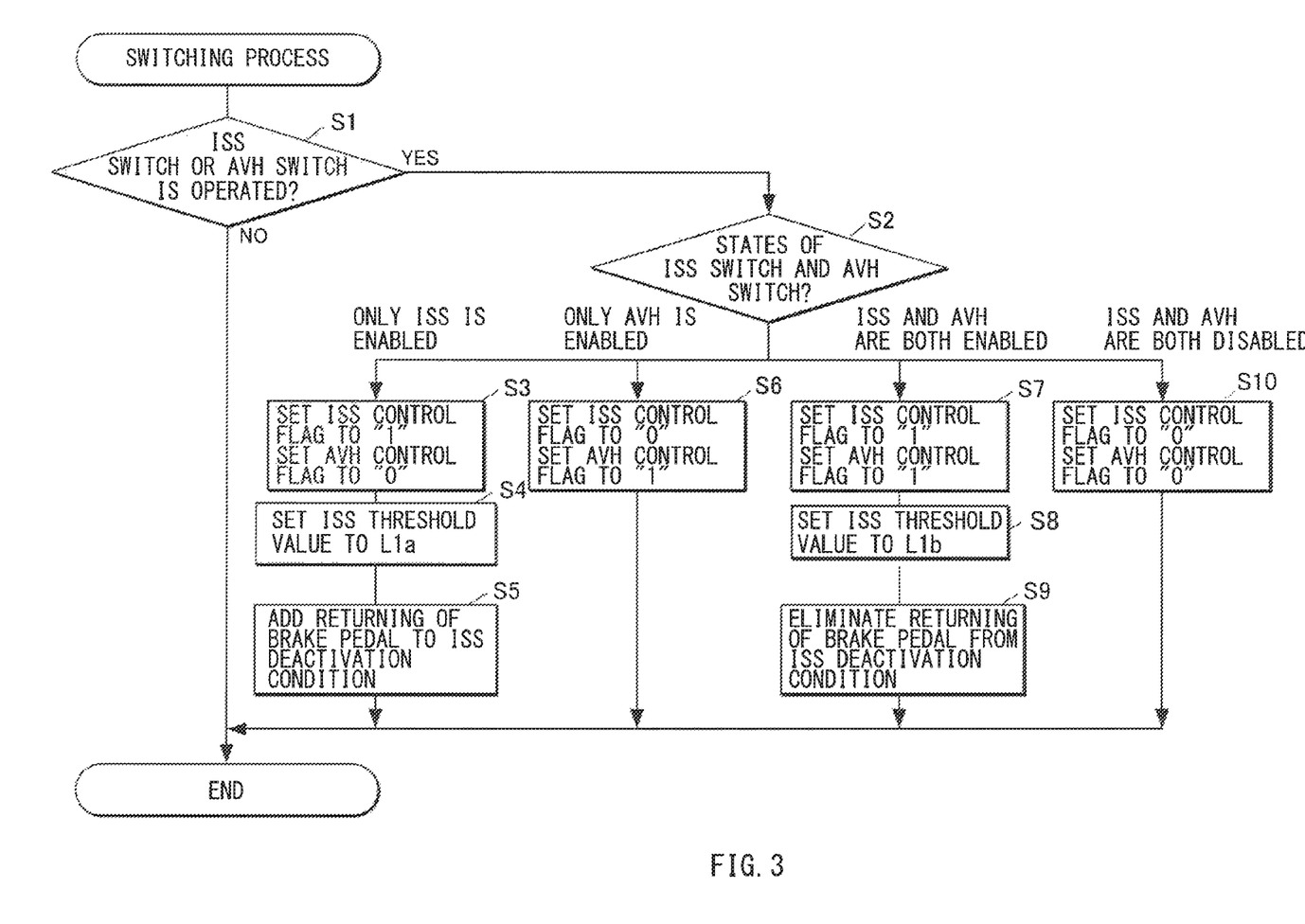
FIG. 3 is a flowchart illustrating a switching process executed by a controller.

In the vehicle 1 according to the first example embodiment, the operation condition of the brake pedal 11 for deactivating the ISS may be different between when only the ISS is enabled and when the ISS and the AVH are both enabled, as described in Steps S5 and S9 illustrated in FIG. 3. In one embodiment, the operation condition of the brake pedal 11 for deactivating the ISS may serve as a "third operation condition". When only the ISS is enabled, the operation condition of the brake pedal 11 for deactivating the ISS may include a returning operation of the brake pedal 11. Instead of this simple returning operation of the brake pedal 11, the operation condition of the brake pedal 11 for deactivating the ISS may include a returning operation of the brake pedal 11 at a speed equal to or larger than a first threshold speed. When the ISS and the AVH are both enabled, the operation condition of the brake pedal 11 for deactivating the ISS may be invalidated. In other words, when the ISS and the AVH are both enabled, the ISS may not be deactivated in response to the simple returning operation of the brake pedal 11 by the driver or the returning operation of the brake pedal 11 at a speed equal to or larger than the first threshold speed by the driver. Instead, the ISS may be deactivated, for example, in response to the start of a depressing operation of the accelerator pedal 12.

In another example embodiment, when the ISS and the AVH are both enabled, the operation condition of the brake pedal 11 for deactivating the ISS may include the returning operation of the brake pedal 11 at a speed equal to or larger than a second threshold speed that is larger than the first threshold speed. In other words, the operation condition of the brake pedal 11 for deactivating the ISS may be changed to a stricter condition or a condition that is more difficult to satisfy. As a result of such a condition change, the ISS may be deactivated in response to the returning operation of the brake pedal 11 by the driver at a speed equal to or larger than the first threshold speed when only the ISS is enabled, but may not be deactivated by the returning operation of the brake pedal 11 by the driver at a speed equal to or larger than the first threshold speed when the ISS and the AVH are both enabled. When the ISS and the AVH are both enabled, the ISS may be deactivated in response to the returning operation of the brake pedal 11 by the driver at a speed equal to or larger than the second threshold speed that is larger than the first threshold speed.

Such a change in the operation condition of the brake pedal 11 for deactivating the ISS helps to achieve an operation for deactivating the ISS applicable to the case where the ISS and the AVH are both enabled. For example, when the ISS and the AVH are both enabled, the driver may depress the brake pedal 11 intentionally with a large stroke to activate the ISS, and thereafter remove and rest his or her foot away from the brake pedal 11 while the AVH is activated. In such a situation, the driver normally has no intention to deactivate the ISS while returning the brake pedal 11. Accordingly, setting the operation condition of the brake pedal 11 for deactivating the ISS in the way described above reduces the occurrence of unintentional deactivation of the ISS. If the driver may change his or her mind and want to deactivate the ISS depending on the circumstances, the driver may release the brake pedal 11 more quickly than usual to deactivate the ISS promptly.

[Switching Process]

With reference to FIG. 3 that is a flowchart illustrating a switching process executed by the controller 20, a control procedure in which the driver or an occupant operates the drive operation unit 10 to switch the AVH and the ISS.

The switching process may be repeated in a predetermined control cycle while the system of the vehicle 1 is operating. Once the switching process is started, the controller 20 may determine whether the ISS switch 15 or the AVH switch 16 has been operated during the previous control cycle (Step S1). If the ISS switch 15 or the AVH switch 16 has not been operated (Step S1: NO), the controller 20 may end the switching process. If the ISS switch 15 or the AVH switch 16 has been operated (Step S1: YES), the controller 20 may determine the states of the ISS switch 15 and the AVH switch 16 (Step S2).

If it is determined that only the ISS is enabled (Step S2: ONLY ISS IS ENABLED), the controller 20 may set an ISS control flag to 1 (one), an AVH control flag to 0 (zero) (Step S3), and the ISS threshold value to the ISS threshold value L1a (Step S4). The controller 20 may then execute a process of adding the returning operation of the brake pedal 11 to the operation condition of the brake pedal 11 for deactivating the ISS (Step S5) and end one cycle of the switching process. The ISS control flag and the AVH control flag may be used to specify whether the ISS control and the AVH control are to be executed in the traveling stop process.

If it is determined that only the AVH is enabled (Step S2: ONLY AVH IS ENABLED), the controller 20 may set the ISS control flag to 0 and the AVH control flag to 1 (Step S6), and end one cycle of the switching process.

If it is determined that the ISS and the AVH are both enabled (Step S2: ISS AND AVH ARE BOTH ENABLED), the controller 20 may set the ISS control flag to 1, the AVH control flag to 1 (Step S7), and the ISS threshold value to the ISS threshold value L1b (Step S8). The controller 20 may then execute a process of eliminating the returning operation of the brake pedal 11 from the operation condition of the brake pedal 11 for deactivating the ISS (Step S9) and end one cycle of the switching process.

If it is determined that the ISS and the AVH are both disabled (Step S2: ISS AND AVH ARE BOTH DISABLED), the controller 20 may set the ISS control flag to 0 and the AVH control flag to 0 (Step S10), and end one cycle of the switching process.

Through such a switching process, the ISS and the AVH may be switched between the enabled state and the disabled state in response to the operation of the ISS switch 15 or the AVH switch 16 by the driver or an occupant. Furthermore, the ISS threshold value may be changed from the ISS threshold value L1a to the ISS threshold value L1b so that the difference between the ISS threshold value and the AVH threshold value set when the ISS and the AVH are both enabled is larger than the difference between the ISS threshold value and the AVH threshold value set when only the ISS is enabled. Furthermore, the operation condition of the brake pedal 11 for deactivating the ISS may be changed to differ between when only the ISS is enabled and when the ISS and the AVH are both enabled.

[Traveling Stop Process]

Figure 4:
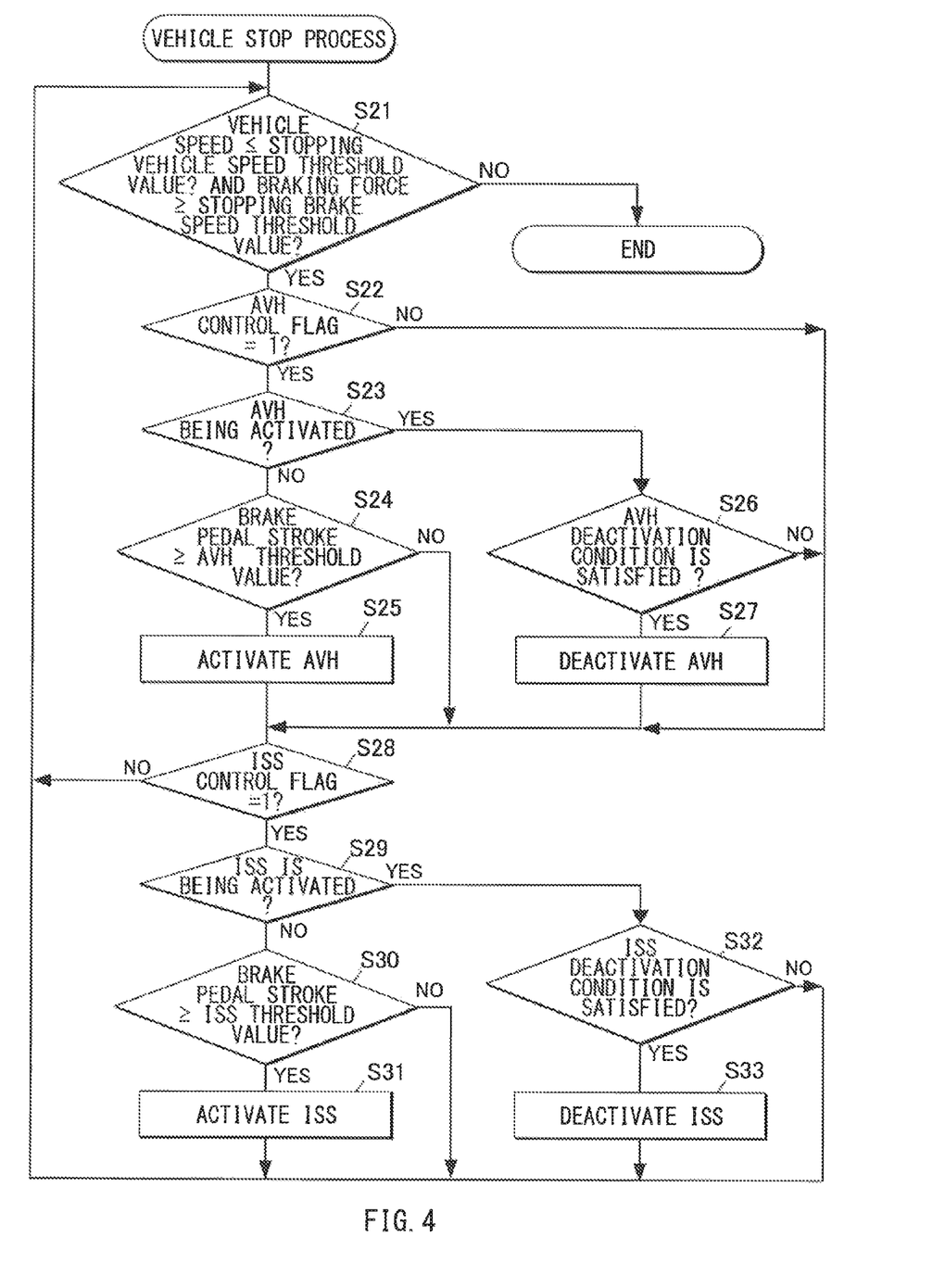
FIG. 4 is a flowchart illustrating a traveling stop process executed by a controller.

FIG. 4 is a flowchart illustrating a traveling stop process executed by the controller 20. The controller 20 may execute the traveling stop process illustrated in FIG. 4 when determining that the vehicle 1 has transitioned to the vehicle stop operation.

Once the traveling stop process starts, the controller 20 may determine whether the vehicle speed is equal to or smaller than a stopping vehicle speed threshold value and whether the braking force is equal to or larger than a stopping brake threshold value (Step S21). The stopping vehicle speed threshold value may indicate a vehicle speed close to the speed of the vehicle 1 in a stopped state. The stopping brake threshold value may indicate the braking force applied immediately before the vehicle 1 comes to a stop. If the vehicle speed is not equal to or smaller than the stopping vehicle speed threshold value and the braking force is not equal to or larger than the stopping brake threshold value (Step S21: NO), the controller 20 may determine that the vehicle 1 will not stop and end the traveling stop process. If the vehicle speed is equal to or smaller than the stopping vehicle speed threshold value and the braking force is equal to or larger than the stopping brake threshold value (Step S21: YES), the controller 20 may determine that the vehicle 1 is about to stop or has already stopped and cause the process to proceed to the next step.

In subsequent Steps S22 to S27, the controller 20 may determine whether several conditions are satisfied and execute the process of activating or deactivating the AVH. If the controller 20 determines that the AVH control flag is set to 1 and the AVH is thus enabled (Step S22: YES), that the AVH is not being activated (Step S23: NO), and that the brake pedal 11 is depressed with a stroke equal to or larger than the AVH threshold value L2 (Step S24: YES), the controller 20 may close the control valve 53 and activate the AVH (Step S25). If the controller 20 determines that the AVH is being activated (Step S23: YES) and that the condition for deactivating the AVH is satisfied (Step S26: YES), the controller 20 may open the control valve 53 and deactivate the AVH (Step S27). The AVH control flag may be set in the switching process illustrated in FIG. 3. If the AVH control flag is set to 0 and the AVH is thus disabled (Step S22: NO), the controller 20 may not perform these steps S23 to S27.

In subsequent Steps S28 to S33, the controller 20 may determine whether several conditions are satisfied and execute the process of activating or deactivating the ISS. If the controller 20 determines that the ISS is enabled (Step S28: YES), that the ISS is not being activated (Step S29: NO), and that the brake pedal 11 is depressed with a stroke equal to or larger than the ISS threshold value L1a or L1b (Step S30: YES), the controller 20 may control the auxiliary unit 4 to stop the idling of the engine 3 (Step S31). If the controller 20 determines that the ISS is being activated (Step S29: YES) and that the condition for deactivating the ISS is satisfied (Step S32: YES), the controller 20 may control the auxiliary unit 4 to restart the engine 3 (Step S33). If the ISS control flag is set to 0 or the ISS is disabled (Step S28: NO), the controller 20 may not perform these steps S29 to S33. As described above with reference to FIGS. 2 and 3, the ISS threshold value L1a or L1b and the operation condition of the brake pedal 11 for deactivating the ISS may differ between when only the ISS is enabled and when the ISS and the AVH are both enabled. Therefore, the activation and the deactivation of the ISS may be achieved through Steps S28 to S33 under different conditions depending on the enabled/disabled state of the AVH.

In the vehicle 1 according to the first example embodiment as described above, the operation condition of the brake pedal 11 for activating the ISS may be changed to differ between when only the ISS is enabled and when the ISS and the AVH are both enabled. For example, the difference between the operation condition of the brake pedal 11 for activating the ISS and the operation condition of the brake pedal 11 for activating the AVH (i.e., the difference between the ISS threshold value and the AVH threshold value) may be larger when the ISS and the AVH are both enabled than when only the ISS is enabled. In this way, it is possible to establish the operation condition of the brake pedal 11 for activating the ISS that provides the driver with a satisfactory operation feeling when only the ISS is enabled, and the operation condition of the brake pedal 11 for activating the AVH that provides the driver with a satisfactory operation feeling when only the AVH is enabled. Furthermore, it is possible to achieve the setting that allows the driver to readily select the activation of one of the ISS and the AVH or the activation of both of the ISS and the AVH by operating the brake pedal 11 when the ISS and the AVH are both enabled.

Furthermore, in the vehicle 1 according to the first example embodiment, when the ISS and the AVH are both enabled, the operation condition of the brake pedal 11 for activating the ISS may be set to a condition satisfiable after the operation condition of the brake pedal 11 for activating the AVH has been satisfied. For example, the ISS threshold value may be set to a value larger than the AVH threshold value. Such a setting allows the driver to activate the AVH without activating the ISS by operating the brake pedal 11. Therefore, it is possible to satisfy the need of the driver to rest his or her foot while the vehicle 1 is stopped and promptly restart the vehicle 1 as soon as a start condition is satisfied.

In the vehicle 1 according to the first example embodiment, the range of variation of the AVH threshold value (i.e., L2-L2=0) may be smaller than the range of variation of the ISS threshold value (i.e., L1a-L1b) when the ISS and the AVH are switched between the enabled state and the disabled state. Therefore, the feeling of the driver operating the brake pedal 11 for activating the AVH may not significantly differ between when only the AVH is enabled and when the ISS and the AVH are both enabled. This reduces the uncomfortable feeling of the driver caused during the operation for the AVH. In general, the operation of the brake pedal 11 performed by the driver when the vehicle 1 comes to a stop may significantly differ between when the AVH is enabled and when the AVH is disabled. For example, the driver may not remove his or her foot from the brake pedal 11 when the AVH is disabled; whereas the driver may remove his or her foot from the brake pedal 11 when the AVH and the ISS are both enabled. Therefore, even if the ISS threshold value varies largely between when the AVH is enabled and when the AVH is disabled, the driver is unlikely to have an uncomfortable feeling during the operation for the ISS. Accordingly, it is possible to achieve the overall operation of the ISS and the AVH using the brake pedal 11 and reducing the uncomfortable feeling of the driver.

In the vehicle 1 according to the first example embodiment, when only the ISS is enabled, the condition for deactivating the ISS may include the returning operation of the brake pedal 11. In contrast, when the ISS and the AVH are both enabled, the returning operation of the brake pedal 11 may be eliminated from the condition for deactivating the ISS. This reduces the occurrence of unintentional deactivation of the ISS when the driver removes his or her foot from the brake pedal 11 by use of the AVH after intentionally activating the ISS by depressing the brake pedal 11.

Second Example Embodiment

Figure 5:
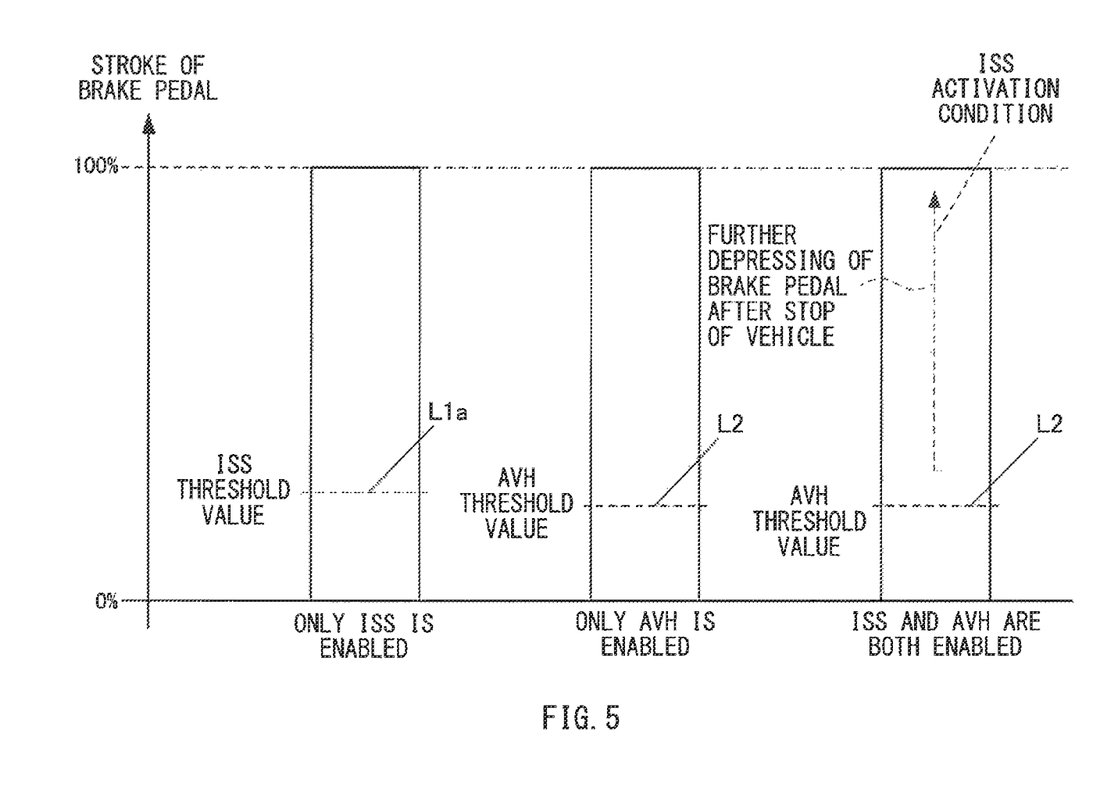
FIG. 5 is a diagram illustrating an ISS threshold value and AVH threshold values according to one example embodiment.

The control of the AVH and the ISS according to a second example embodiment will now be described. FIG. 5 is a diagram illustrating an ISS threshold value and an AVH threshold value according to the second example embodiment.

In the vehicle 1 according to the second example embodiment, one or both of the ISS and the AVH may be activated by operating the brake pedal 11 to satisfy a predetermined operation condition when the vehicle 1 comes to a stop. For example, when only the ISS is enabled, the operation condition of the brake pedal 11 for activating the ISS may include depressing the brake pedal 11 with a stroke equal to or larger than the ISS threshold value L1a. When only the AVH is enabled, the operation condition of the brake pedal 11 for activating the AVH may include depressing the brake pedal 11 at a stroke equal to or larger than the AVH threshold value L2. When the ISS and the AVH are both enabled, the operation condition of the brake pedal 11 for activating the AVH may include depressing the brake pedal 11 at a stroke equal to or larger than the AVH threshold value L2. The operation condition of the brake pedal 11 for activating the ISS may include further depressing the brake pedal 11 after the stop of the vehicle 1. The condition of further depression may be limited to further depressing the brake pedal 11 with a stroke equal to or larger than the AVH threshold value L2.

The AVH threshold value L2 set when only the AVH is enabled and the AVH threshold value L2 set when the ISS and the AVH are both enabled may be the same as illustrated in FIG. 5, or may be different from each other. The ISS threshold value L1a set when only the ISS is enabled may be larger than the AVH threshold value L2 as illustrated in FIG. 5, or may be the same as or smaller than the AVH threshold value L2. The operation condition of the brake pedal 11 for activating the ISS set when the ISS and the AVH are both enabled may include slight further depression of the brake pedal 11 or may not include depression with a stroke less than a predetermined threshold value.

With the operation conditions of the brake pedal 11 described above, in a case where the ISS and the AVH are both enabled, the AVH may be activated first when the driver depresses the brake pedal 11 with a stroke equal to or larger than the AVH threshold upon the stop of the vehicle 1, and then the ISS may be activated when the driver further depresses the brake pedal 11 after the stop of the vehicle 1. In contrast, only the AVH may be activated without the ISS being activated when the driver depresses the brake pedal 11 with a stroke equal to or larger than the AVH threshold value upon a stop of the vehicle 1 and then holds or returns the brake pedal 11 or removes his or her foot from the brake pedal 11.

In the vehicle 1 according to the second example embodiment, the operation condition of the brake pedal 11 for deactivating the ISS may differ between when only the ISS is enabled and when the ISS and the AVH are both enabled. The different operation conditions may be set in the same manner as in the first example embodiment.

According to the second example embodiment, the control of the ISS and the AVH may be achieved through the switching process illustrated in FIG. 3 and the traveling stop process illustrated in FIG. 4 with Steps S8, S4, and S30 being modified. In the second example embodiment, Step S8 in FIG. 3 may be modified to a step in which the ISS threshold value is invalidated and the operation of further depressing the brake pedal 11 after the stop of the vehicle 1 is added to the operation condition for the activation of the ISS. Step S4 in FIG. 3 may be modified to a step in which the ISS threshold value is set to an effective value L1a and the operation of further depressing the brake pedal 11 after the stop of the vehicle 1 is eliminated from the operation condition for activating the ISS. Additionally, Step S30 in FIG. 4 may be modified to a step of determining whether an operation of the brake pedal 11 that satisfies the operation condition for activating the ISS has been executed.

In the above-described vehicle 1 according to the second example embodiment, the operation condition of the brake pedal 11 for activating the ISS may differ between when only the ISS is enabled and when the ISS and the AVH are both enabled. Therefore, it is possible to establish an operation condition for activating the ISS that provides the driver with a satisfactory operation feeling when only the ISS is enabled, and the operation condition for activating the AVH that provides the driver with a satisfactory operation feeling when only the AVH is enabled. Furthermore, it is possible to achieve the setting that allows the driver to readily select the activation of one of the ISS and the AVH or the activation of both of the ISS and the AVH by operating the brake pedal 11 when the ISS and the AVH are both enabled.

Furthermore, in the vehicle 1 according to the second example embodiment, when the ISS and the AVH are both enabled, the operation condition of the brake pedal 11 for activating the ISS (i.e., further depressing the brake pedal 11 after the stop of the vehicle 1) may be satisfiable after the operation condition for activating the AVH (i.e., depressing the brake pedal 11 with a stroke larger than the AVH threshold value) has been satisfied. Such a setting allows the driver to readily select the activation of only the AVH or the activation of both of the AVH and the ISS by operating the brake pedal 11.

In the vehicle 1 according to the second example embodiment, the operation condition of the brake pedal 11 for activating the ISS may significantly differ between when one of the ISS and the AVH is enabled and when the ISS and the AVH are both enabled. In contrast, the operation condition of the brake pedal 11 for activating the AVH may not significantly differ or may be kept unchanged, for example. Therefore, the feeling of the driver operating the brake pedal 11 for activating the AVH may not significantly differ between when only the AVH is enabled and when the ISS and the AVH are both enabled. This reduces the uncomfortable feeling of the driver caused during the operation for the AVH. Since the operation of the brake pedal 11 when the vehicle 1 comes to a stop may significantly differ depending on the enabled/disabled state of the AVH, the driver is unlikely to have an uncomfortable feeling during the operation for the ISS even if the operation condition for activating the ISS varies largely. Accordingly, it is possible to achieve the overall operations of the ISS and the AVH using the brake pedal 11 and reducing uncomfortable feeling of the driver.

In the vehicle 1 according to the second example embodiment, the operation condition of the brake pedal 11 for deactivating the ISS may differ between when only the ISS is enabled and when the ISS and the AVH are both enabled, as in the first example embodiment. Therefore, the same effects as those in the first example embodiment are achieved in terms of the deactivation of the ISS.

Although some example embodiments of the technology have been described above, example embodiments of the technology should not be limited to the example embodiments described above. For example, in at least one example embodiment described above, the operation condition of the brake pedal 11 for activating the ISS may be changed to differ between when only the ISS is enabled and when the ISS and the AVH are both enabled. However, in another embodiment, the operation condition of the brake pedal 11 for activating the AVH may be changed instead. For example, the AVH threshold value may be set to be larger when only the AVH is enabled than when the AVH and the ISS are both enabled. In still another example embodiment, the operation condition of the brake pedal 11 for activating the AVH may be changed whereas the operation condition of the brake pedal 11 for activating the ISS may be kept unchanged. In any example embodiment, the operation conditions may be established so that the difference between the operation condition for activating the ISS and the operation condition for the activation of the AVH is larger when the AVH and the ISS are both enabled than when only one of the ISS and the AVH is enabled. Such a change in the operation condition may facilitate the activation of only one of the ISS and the AVH when the ISS and the AVH are both enabled.

In some example embodiments described above, when the AVH and the ISS are both enabled, the operation condition of the brake pedal 11 for activating the ISS may be set to a condition satisfiable after the operation condition of the brake pedal 11 for activating the AVH has been satisfied. However, the operation conditions may be satisfied in an opposite order. Such a setting allows the driver to readily activate only the ISS without activating the AVH by operating the brake pedal 11 when the ISS and the AVH are both enabled. In an example embodiment in which such a setting is employed, the operation condition of the brake pedal 11 for deactivating the ISS may be eliminated or changed to a condition that is less likely to be satisfied only when the AVH is activated.

In some example embodiments described above, the operation condition of the brake pedal 11 for activating or deactivating the AVH or the ISS may be determined on the basis of a stroke of the brake pedal 11. However, the operation condition of the brake pedal 11 may include a condition determined on the basis of one or more of the angle, the pedal pressure, and the operation speed of the brake pedal 11. The operation amount of the brake pedal according to some example embodiments of the technology may also be referred to as an operation angle, a pedal pressure, or an operation speed, besides a stroke. The condition for activating the AVH or the ISS may include other conditions, such as the slope of the road or the elapsed time after the previous deactivation of the ISS, besides the operation conditions of the brake pedal 11. Other details described in this example embodiments and modification may be modified as appropriate without departing from the spirit of the disclosure.

According to the disclosure, when the automatic vehicle hold system and the idling stop system are both switched to the enabled state, at least one of the first operation condition of the brake pedal for maintaining the braking state or the second operation condition of the brake pedal for stopping idling may be changed. Therefore, the flexibility in setting the first operation condition and the second operation condition may increase when the automatic vehicle hold system and the idling stop system are both enabled. Therefore, it is possible to set the first and the second operation conditions so that the first operation condition and the second operation condition largely differ from each other when the automatic vehicle hold system and the idling stop system are both enabled. Thereby, it is possible to readily select the activation of one of the idling stop system and the automatic vehicle hold system or the activation of both of the idling stop system and the automatic vehicle hold system.

The invention claimed is:

1. A vehicle comprising:
   a controller configured to control an automatic vehicle hold system and an idling stop system, the automatic vehicle hold system maintaining a brake of the vehicle even after an operation of a brake pedal is canceled, the idling stop system stopping idling of an internal combustion engine; and
   an operating unit configured to switch the automatic vehicle hold system and the idling stop system between an enabled state and a disabled state in response to an operation by an occupant of the vehicle, the occupant including a driver of the vehicle, wherein
   the controller is configured to
      activate the automatic vehicle hold system in a case where the operation of the brake pedal satisfies a first operation condition when the vehicle comes to a stop,
      activate the idling stop system in a case where the operation of the brake pedal satisfies a second operation condition when the vehicle comes to a stop, and
      change at least one of the first operation condition or the second operation condition when the automatic vehicle hold system and the idling stop system are both switched to the enabled state by the operating unit.

2. The vehicle according to claim 1, wherein
the first operation condition is that an operation amount of the brake pedal is equal to or larger than a first threshold value, and
when the automatic vehicle hold system and the idling stop system are both enabled, the second operation condition is satisfiable after the first operation condition has been satisfied.

3. The vehicle according to claim 2, wherein
the second operation condition is that the operation amount of the brake pedal is equal to or larger than a second threshold value, and
a difference between the second threshold value and the first threshold value set when the automatic vehicle hold system and the idling stop system are both enabled is larger than a difference between the second threshold value and the first threshold value set when one of the automatic vehicle hold system and the idling stop system is enabled.

4. The vehicle according to claim 1, wherein
a range of variation of the first operation condition upon switching between a case where the automatic vehicle hold system and the idling stop system are both enabled and a case where the automatic vehicle hold system is enabled and the idling stop system is disabled is smaller than a range of variation of the second operation condition upon switching the case where the automatic vehicle hold system and the idling stop system are both enabled and a case where the automatic vehicle hold system is disabled and the idling stop system is enabled.

5. The vehicle according to claim 2, wherein
a range of variation of the first operation condition upon switching between a case where the automatic vehicle hold system and the idling stop system are both enabled and a case where the automatic vehicle hold system is enabled and the idling stop system is disabled is smaller than a range of variation of the second operation condition upon switching the case where the automatic vehicle hold system and the idling stop system are both enabled and a case where the automatic vehicle hold system is disabled and the idling stop system is enabled.

6. The vehicle according to claim 3, wherein
a range of variation of the first operation condition upon switching between a case where the automatic vehicle hold system and the idling stop system are both enabled and a case where the automatic vehicle hold system is enabled and the idling stop system is disabled is smaller than a range of variation of the second operation condition upon switching the case where the automatic vehicle hold system and the idling stop system are both enabled and a case where the automatic vehicle hold system is disabled and the idling stop system is enabled.

7. The vehicle according to claim 1, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

8. The vehicle according to claim 2, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

9. The vehicle according to claim 3, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

10. The vehicle according to claim 4, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

11. The vehicle according to claim 5, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

12. The vehicle according to claim 6, wherein
the controller is configured to
deactivate the idling stop system in a case where the operation of the brake pedal satisfies a third operation condition when the idling stop system is being activated, and
when the automatic vehicle hold system and the idling stop system are both enabled, eliminate the third operation condition from a condition for deactivating the idling stop system or change the third operation condition to a condition that is more difficult to satisfy than the third operation condition before the change.

13. The vehicle according to claim 1, wherein the first operation condition and the second operation condition are determined on a basis of one or more of a stroke of the brake pedal, an angle of the brake pedal, a pedal pressure on the brake pedal, and an operation speed of the brake pedal.

14. The vehicle according to claim 5, wherein the first operation condition, the second operation condition, and the third operation condition are determined on a basis of one or more of a stroke of the brake pedal, an angle of the brake pedal, a pedal pressure on the brake pedal, and an operation speed of the brake pedal.

* * * * *